United States Patent
Mendel et al.

(10) Patent No.: US 7,467,314 B2
(45) Date of Patent: *Dec. 16, 2008

(54) SYSTEMS AND METHODS FOR REDUCING STATIC AND TOTAL POWER CONSUMPTION IN A PROGRAMMABLE LOGIC DEVICE

(75) Inventors: David Mendel, Sunnyvale, CA (US); Vaughn Betz, Toronto (CA)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/642,287

(22) Filed: Dec. 19, 2006

(65) Prior Publication Data

US 2007/0101175 A1 May 3, 2007

Related U.S. Application Data

(63) Continuation of application No. 10/796,501, filed on Mar. 8, 2004, now Pat. No. 7,188,266.

(51) Int. Cl.
*G06F 1/00* (2006.01)
*G06F 1/26* (2006.01)
*G06F 1/32* (2006.01)

(52) U.S. Cl. ........................... 713/320; 713/300
(58) Field of Classification Search ................. 713/320
See application file for complete search history.

(56) References Cited

U.S. PATENT DOCUMENTS

| | | | |
|---|---|---|---|
| 5,880,620 A | 3/1999 | Gitlin et al. | |
| 6,407,576 B1 | 6/2002 | Ngai et al. | |
| 6,621,325 B2 * | 9/2003 | Hart et al. | 327/534 |
| 6,744,301 B1 | 6/2004 | Tschanz et al. | |
| 6,777,978 B2 | 8/2004 | Hart et al. | |
| 6,930,510 B2 | 8/2005 | New | |
| 6,980,026 B1 * | 12/2005 | Trimberger | 326/40 |
| 7,188,266 B1 * | 3/2007 | Mendel et al. | 713/320 |

OTHER PUBLICATIONS

Jason H. Anderson and Farid N. Najm, "A Novel Low-Power FPGA Routing Switch" (2004) (unpublished, submitted to the 2004 IEEE Custom Integrated Circuits Conference, Orlando, Florida, Oct. 3-6, 2004).

Jason H. Anderson et al., "Active Leakage Power Optimization for FPGAs", 2004 ACM/SIGDA Twelfth International Symposium on Field Programmable Gate Arrays, Monterey, California, pp. 33-41 (Feb. 22-24, 2004).

Jason H. Anderson and Farid N. Najm, "Low-Power Programmable Routing Circuitry for FPGAs" (2004) (unpublished, submitted to the 2004 International Conference on Computer Aided Design, San Jose, California, Nov. 7-11, 2004).

(Continued)

*Primary Examiner*—Thuan N Du
*Assistant Examiner*—Michael J Brown
(74) *Attorney, Agent, or Firm*—Brian E. Mack; Ropes & Gray LLP

(57) ABSTRACT

A method and system for reducing power consumption in a programmable logic device (PLD) is provided. The power consumption may be reduced by preferably continually considering power consumption as a factor in circuit design during the technology mapping, routing, and period following routing of the programmable logic device.

20 Claims, 12 Drawing Sheets

OTHER PUBLICATIONS

Deming Chen and Jason Cong, "Low-Power Technology Mapping for FPGA Architectures with Dual Supply Voltages", 2004 ACM/SIGDA Twelfth International Symposium on Field Programmable Gate Arrays, Monterey, California, pp. 109-117 (Feb. 22-24, 2004).

A. Gayasen et al., "Reducing Leakage Energy in FPGAs Using Region-Constrained Placement", 2004 ACM/SIGDA Twelfth International Symposium on Field Programmable Gate Arrays, Monterey, California, pp. 51-58 (Feb. 22-24, 2004).

Fei Li et al., "Low-Power FPGA Using Pre-defined Dual-Vdd/Dual-Vt Fabrics", 2004 ACM/SIGDA Twelfth International Symposium on Field Programmable Gate Arrays, Monterey, California, pp. 42-50 (Feb. 22-24, 2004).

Fei Li et al., "FPGA Power Reduction Using Configurable Dual-Vdd", 2004 Design Automation Conference, San Diego, California, pp. 735-740 (Jun. 7-11, 2004).

Arifur Rahman and Vijay Polavarapuv, "Evaluation of Low-Leakage Design Techniques for Field Programmable Gate Arrays", 2004 ACM/SIGDA Twelfth International Symposium on Field Programmable Gate Arrays, Monterey, California, pp. 23-30 (Feb. 22-24, 2004).

"Mercury Programmable Logic Device Family", Data Sheet, Version 2.2, Altera Corporation, pp. 17-28 (Jan. 2003).

* cited by examiner

TWO INPUT LOOK-UP TABLE

SYSTEMS AND METHODS FOR REDUCING STATIC AND TOTAL POWER CONSUMPTION IN A PROGRAMMABLE LOGIC DEVICE

This application is a continuation of, commonly-assigned U.S. patent application Ser. No. 10/796,501, filed Mar. 8, 2004, now U.S. Pat. No. 7,188,266, which is hereby incorporated by reference herein in its entirety.

STATEMENT OF RELATED CASE

This application is being filed together with co-pending U.S. patent application Ser. No. 10/796,502, entitled, "Systems and Methods for Reducing Static and Total Power Consumption in Programmable Logic Device Architectures", which is hereby incorporated by reference herein in its entirety.

BACKGROUND OF THE INVENTION

This invention relates to reducing static and total power in electronic devices. More particularly, this invention relates to reducing static and total power consumption in a programmable logic device (PLD).

Gate thickness of transistors in PLDs have always trended thinner and thinner. As the gate thicknesses approach 90 nanometers, the transistors do not fully turn OFF. Thus, a pass gate in the OFF position continues to pass some current. It follows that the source of power consumption in the static state of such a PLD having thin gate thicknesses tends to come from the leakage of the transistors in the PLD due to their passing current between VCC and GND, even when they are in the OFF position.

There is also an additional gate leakage effect that exists at 90 nm gate thickness but which becomes very large at 65 nm gate thickness. This additional gate leakage effect may be either gate to substrate leakage or gate to source/drain leakage.

PLDs are typically designed with a multitude of field-effect transistors (FETs). When a FET is turned OFF, the leakage depends for the most part on whether there is a voltage difference between the source and the drain. The majority of power consumption in the static state of a PLD which implements 90 nanometer line widths comes from leakage of FETs. The leakage of the FETs results from a voltage differential existing between the drain and the source combined with the transistor not fully turning itself OFF.

Therefore, it would be desirable to optimize a PLD to consume less power, even at relatively narrow gate widths, while maintaining the level of the functionality of the PLD.

SUMMARY OF THE INVENTION

It is an object of this invention to optimize a PLD to consume less power, even at relatively narrow gate widths, while maintaining the level of the functionality of the PLD.

Systems and methods for reducing static and total power in a PLD according to the invention are provided. The systems and methods preferably reflect concepts that can be implemented to reduce leakage current of FETs as well as other power-saving concepts in a PLD. It should be noted that the effect of implementing these concepts should preferably be weighed against the deleterious effects of the implementation of these concepts on other PLD areas of importance—e.g., routability, Computer-Aided Design (CAD) run time, and speed of the circuitry implemented on the PLD.

Systems and method for reducing power according to the invention also preferably may be implemented to reduce dynamic power consumption as well as static power and total power consumption.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

It is common in programmable logic devices to provide logic elements which are based on look-up tables. For example, programmable logic devices available from Altera Corporation, of San Jose, Calif., may include logic elements built at least in part around four-input, or some other suitable number of inputs, look-up tables. The logic elements can be programmed and programmably interconnected to simulate any logic function.

Figure 1:
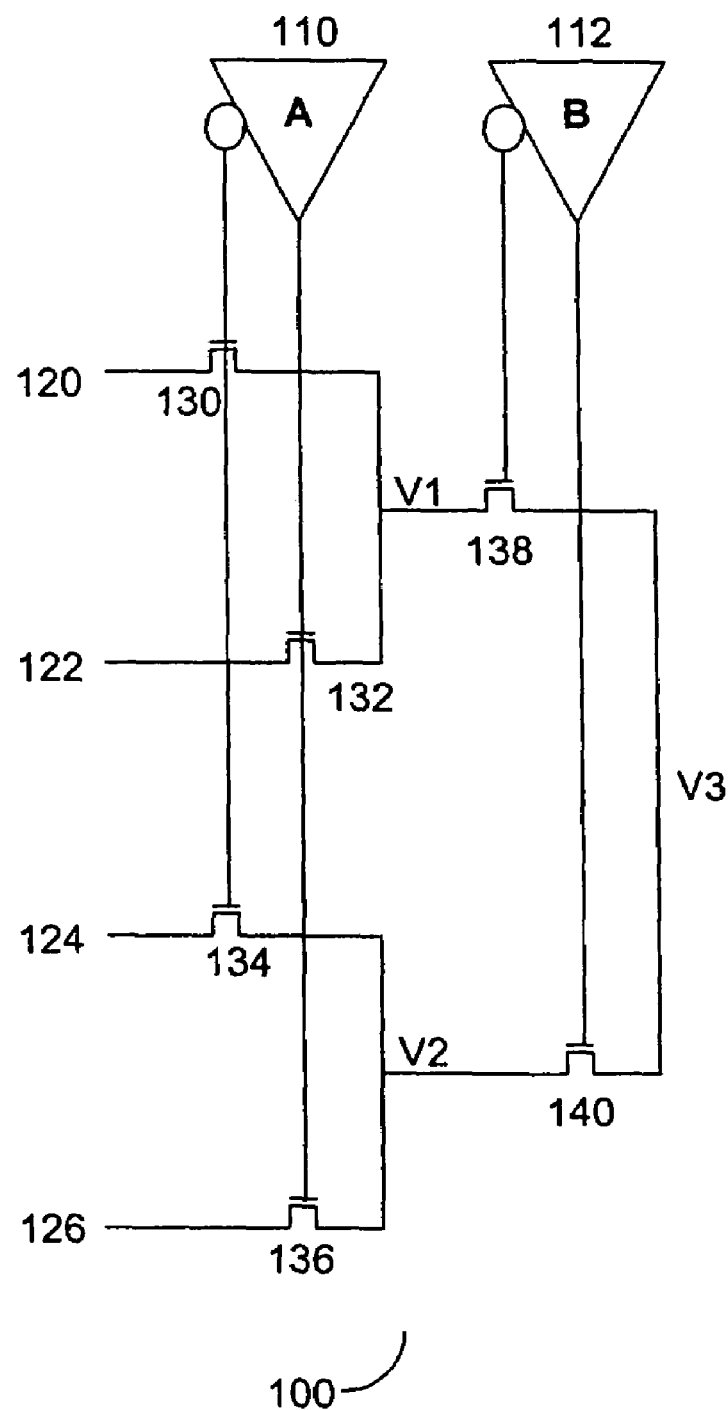
FIGS. 1-5 are schematic diagrams for circuits upon which methods and systems according to the invention may be implemented.

FIG. 1 shows a two-input look-up table (LUT) 100 that may be used in systems and methods according to the invention. LUT 100 preferably includes inputs 110 and 112 (which are also labeled as A and B in order to clarify examples described below in the application), storage locations 120, 122, 124, and 126 and pass transistors 130, 132, 134, 136, 138, and 140.

LUT 100 preferably operates as follows. The inputs receive a two-bit signal—i.e., 00, 01, 10, or 11. Then, in response to the two bit signal received at the input, the output of the LUT at V3 preferably provides an output signal selected from one of the storage locations.

In one particular embodiment of the invention, if input 110 is not used, then it can be assumed that input 110 is tied high to the VCC. In that case, pass transistors 130 and 134 are OFF. Storage location 120 and storage location 124 are "don't care" bits because their stored value has no effect on the LUT output. The values associated with storage locations 120 and 124 can be set arbitrarily—i.e., either high or low. In order to reduce the leakage current in the LUT, it follows that the voltage differential between the respective sources and drain may be minimized by setting storage location 120 equal to storage location 122 and storage location 124 equal to storage location 126. Thus, there will be a minimal voltage difference across any of transistors 130, 132, 134 and 136, and the source-drain leakage of these transistors will be minimized.

To obtain this result requires two conditions. First, the LUT should be synthesized whereby A is the unused input rather than B. If B is the unused input, then none of transistors can be set in a configuration to minimize leakage. And, second, the don't care bits should be set appropriately.

This concept can preferably be expanded to a LUT-n. If the function being implemented on the LUT-n is only a function of (n-1) variables or fewer, then the input(s) having the most transistors may always be selected to be the unused variable, and half or more of the LUT-mask (the LUT mask defines the values that are in the storage locations in the LUT) can be synthesized as don't care bits. In FIG. 1, the entire first stage—i.e., the stage corresponding to input 110—may be formed such that each of transistors 130, 132, 134 and 136 do not have a voltage differential across them for all operational states of the PLD.[1]

Figure 4:
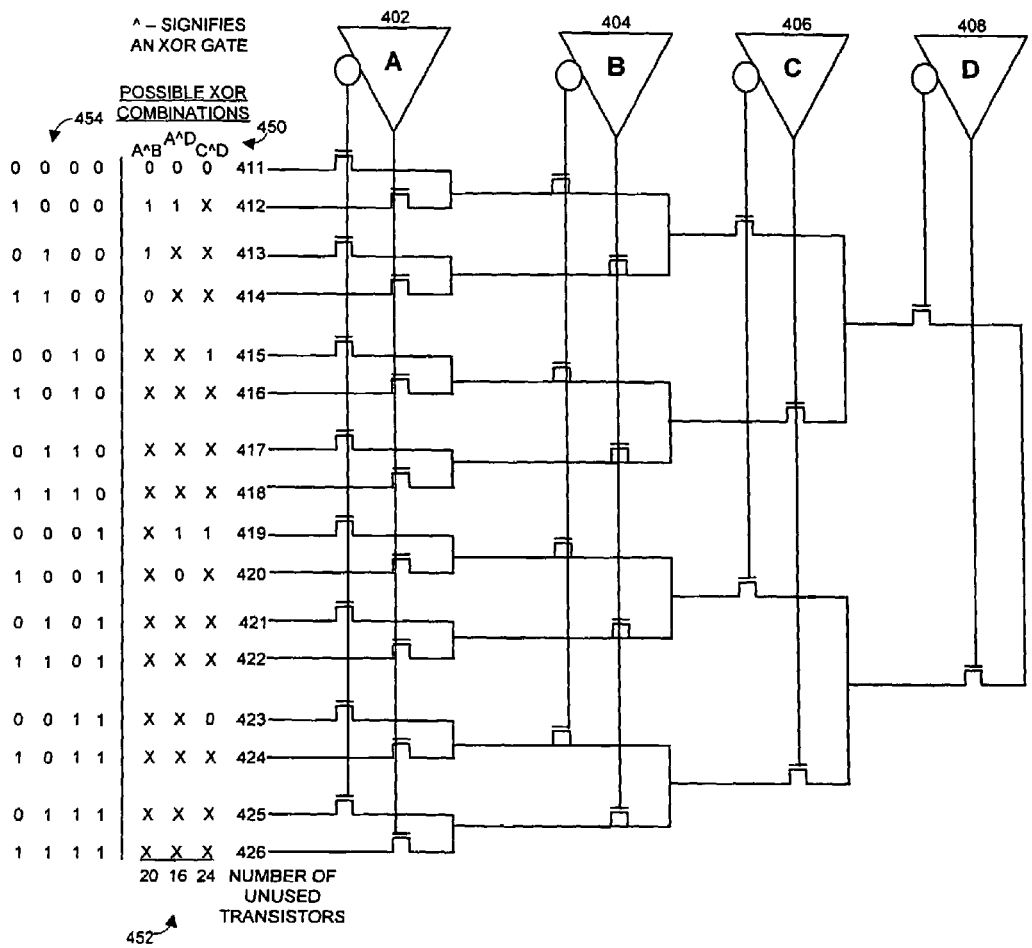

[1] In practical cases, a simulation of the different combinations may be required to determine which situation is better; a simplistic goal of moving as many inputs to the area associated with the greatest number of pass transistors may not be sufficient. The following example of technology mapping according to the invention illustrates this. Given an XOR2 in a LUT4 (as shown in FIG. 4), the best circuit with respect to power saving is to implement the two inputs as input 406 XOR input 408 resulting in 24 leak-free transistors. If this is not possible—e.g., because of related or unrelated routing congestion—and one input must be on input 402, then the other input should preferably be on input 404 rather than input 408. This approach provides 20 leak free transistors instead of 16 leak free transistors. In addition, a simulation can take into account other effects such as an embedded driver or inverter that may draw a different amount of power depending on whether it is driven by a 1 or a 0, the relative size of the transistors (a typical circuit will have a mixture of big and small transistors, the small transistors use less power but are slower), and the added advantage of having multiple transistors OFF in series.

This solution may provide widespread power saving. In fact, it is estimated that in a typical PLD, approximately half of the LUTs that are used do not utilize at least one input.

Based at least in part on this principle, the following configurations and methods may be implemented in the area of technology mapping[2]—i.e., one of the tasks performed by computer aided design (CAD) systems to implement a logic circuit in PLDs (the mapping may be used to generate a network of building blocks of the target PLD by taking physical restrictions such as number of inputs into consideration)—in order to reduce leakage current and, thereby, reduce static and total power consumption of a PLD according to the invention. These configurations and methods may preferably be implemented using the CAD systems or other software that programs the PLD. This software is typically used to program the PLD to carry out the desired logic functions. It should be noted that, except where specified, the configurations and methods described herein, and the rules associated therewith, may preferably be carried out independently of one another and in any desired sequence with respect to one another.

[2] These techniques can also be implemented by other operations during the CAD flow that modify the netlist. For example, in some flows, the router is free to rotate the inputs to the look-up table in order to get more routing flexibility. In this case, the router should also take into account the techniques contained in this application—i.e., rotating the inputs to provide more flexibility with respect to power consumption.

As described above with respect to FIG. 1, the methods according to the invention also relate to a function identified to be put in a LUT wherein the function does not require all the LUT inputs. In such a design, it is preferable according to the invention to rotate the unused inputs of the LUT such that the weighted sum of leaked power across transistors is minimized. The particular goals of rotation, and how these goals affect power leakage, is described in more detail below. This designing and operating principle preferably takes into account the flexibility of the particular device with respect to being able to arbitrarily set unused LUT mask bits to minimize power. If however, the unused bits will not be able to be arbitrarily set because of other considerations, then this fact should preferably be considered in the calculus used to obtain the accurate weighted minimum sum of leaked power.

Another method by which to implement the previous principle of reducing the weighted sum of leaked power by rotating the inputs of the LUT is as follows. This following rule may preferably be implemented to reduce static and total power consumption according to the invention. For power reduction, it is most efficient to rotate the storage locations such that adjacent storage locations of the LUT are grouped into 1's and 0's so as to maximize the number of pass transistors that have substantially identical voltage on both their respective drains and sources. In this way, these pass transistors do not leak.

Another method of reducing static and total power consumption may be implemented in a function identified to be put in a LUT where the relative frequency of 1's and 0's are known on the inputs. For example, the relative frequency of the 1's and 0's for a particular design—e.g., wherein, on a particular input, a 1 may occur 90% of the time—may be determined by simulations based on user vectors (which simulate running a user-defined system), expected logic value propagation from user defined states on input pins, user identification of an idle or stand-by state which may be more important for static power, or other techniques used in dynamic power analysis.

One example of this method can be shown with respect to FIG. 1. First, one may assume that the function A OR (NOT A AND NOT B) is to be implemented. This function requires the storage locations 120, 122, 124, and 126 to be configured as 1, 1, 0, and 1, respectively.

If it is known that most of the circuit operation time is spent in the input 110=1, and input 112=1 situation, then most of the time, V2=1 which matches the voltage of V1, and, therefore, there will not be leakage across the second stage pass transistors 138 and 140.

If the LUT inputs 110 and 112 are rotated to create the equivalent function B OR (NOT A AND NOT B), storage locations 120, 122, 124 and 126 are 1, 0, 1, and 1 respectively. In this case, when A=1, B=1, V1=0, and V2=0, there is leakage across pass transistors 138 and 140. This technique should be appropriately weighted based on the calculated static power saved, the percent of time the circuit will be in the user-preferred state, and the relative cost of implementation with respect to power versus other low-power techniques. In the case that the relative frequency of 1's and 0's is known or can be estimated—e.g., because of simulations using user vectors, or statistical methods based on propagating average values from input pins—and where the function is not directly registered—i.e., it is not required to be either a 1 or 0—the effect of look at function and NOT(function) should be evaluated. For example, if the output drives an inverting buffer, it may be that driving the buffer with a 0 for the majority of the operational time is beneficial due to the different leakage characteristics of N versus P devices. In the case of a non-inverting buffer, suitable calculations should be done to take into account the relative sizing of each transistor.

Figure 2:
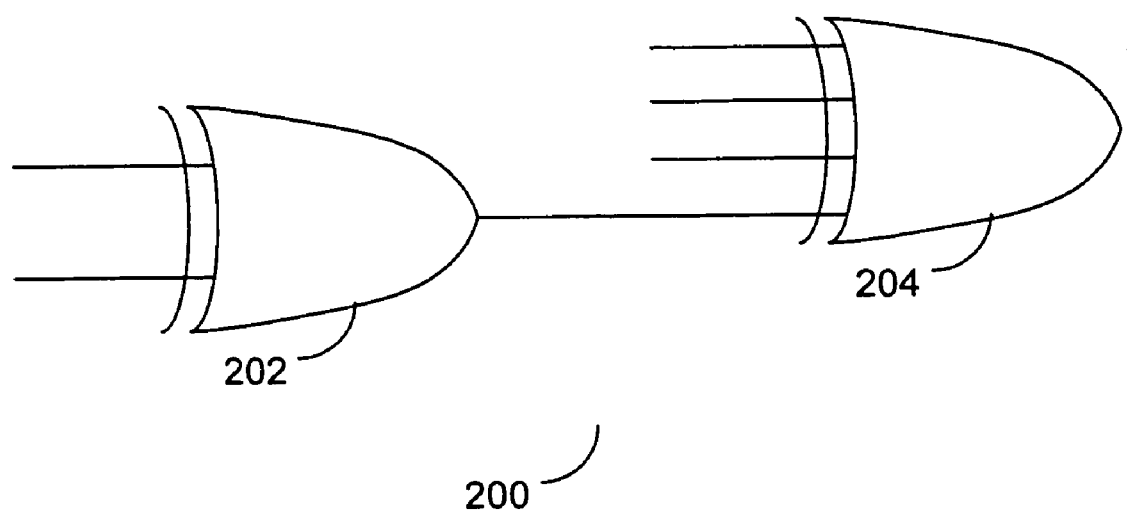

With respect to a more general rule concerning power consumption reduction, when comparing any alternative technology mappings, the estimated power of each technology mapping should preferably be taken into account when determining which choice to make. For example, using LUT-4's as a base, an XOR5 element can be implemented as an XOR2 feeding an XOR4 or as an XOR3 feeding another XOR3. FIG. 2 shows an XOR5 200 being implemented as an XOR2 202 and an XOR4 204.

Figure 3:
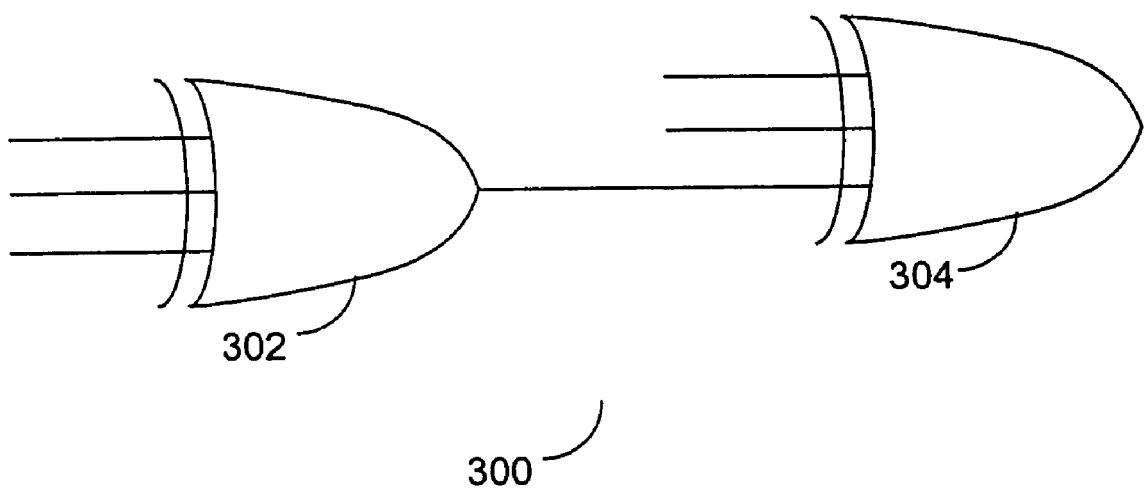

FIG. 3 shows an XOR5 300 being implemented as an XOR3 302 followed by an XOR3 304. As is evident from FIG. 3, each of XOR3s 302 and 304 only require three of the inputs available to a 4-Input LUT.

The following is an input/output table for the LUT 300. It can be seen that the input table allows multiple (12 in this example) don't care bits (which can be rotated into the first position to minimize static power consumption by maximizing the number of don't care bits) in XOR2 302 but no don't care bits in XOR4 304. This arrangement does not allow the design to take advantage of the fact that the greatest power saving is associated with the first set of don't care bits (because it is associated with the greatest number of pass transistors). By allowing multiple don't care bits in the first LUT and no don't care bits in the second LUT, the power saving is limited because the don't care bits are located at multiple positions in the first LUT and the higher power-saving first position of the second LUT cannot used for power-saving don't care bits.

| Input to XOR2 | Output from XOR2 |
|---|---|
| (0, 0) | 0 |
| (0, 1) | 1 |
| (1, 1) | 0 |
| (1, 0) | 1 |
| x | 0 |
| x | 0 |
| x | 0 |
| x | 0 |
| x | 0 |
| x | 0 |
| x | 0 |
| x | 0 |
| x | 0 |
| x | 0 |
| x | 0 |
| x | 0 |

| Input to XOR4 | Output from XOR4 |
|---|---|
| (0, 0, 0, 0) | 0 |
| (0, 0, 0, 1) | 1 |
| (0, 0, 1, 0) | 1 |
| (0, 0, 1, 1) | 0 |
| (0, 1, 0, 0) | 1 |
| (0, 1, 0, 1) | 0 |
| (0, 1, 1, 0) | 0 |
| (0, 1, 1, 1) | 1 |
| (1, 0, 0, 0) | 1 |
| (1, 0, 0, 1) | 0 |
| (1, 0, 1, 0) | 0 |
| (1, 0, 1, 1) | 0 |
| (1, 1, 0, 0) | 0 |
| (1, 1, 0, 1) | 0 |
| (1, 1, 1, 0) | 0 |
| (1, 1, 1, 1) | 0 |

The small "x" in the table signifies a RAM bit of the LUT that is free to be either a 0 or a 1 and does not affect the indicated function of the LUT. These bits can be set to either 0 or 1 as best benefits other considerations such as static power.

The following table illustrates a single XOR3 implemented on a four-input LUT. From this table, it is clear that, with respect to implementing an XOR5 on four-input based LUTs, two XOR3 LUTs are better suited with respect to power consumption than an XOR2 and an XOR4.

| Input to XOR3 | Output from XOR3 |
|---|---|
| (0, 0, 0) | 0 |
| (0, 0, 1) | 1 |
| (0, 1, 1) | 0 |
| (0, 1, 0) | 1 |
| (1, 0, 0) | 1 |
| (1, 0, 1) | 0 |
| (1, 1, 0) | 0 |
| (1, 1, 1) | 0 |
| x | 0 |
| x | 0 |
| x | 0 |
| x | 0 |
| x | 0 |
| x | 0 |
| x | 0 |
| x | 0 |

To further illustrate the previous point, FIG. 4 shows a four-input LUT 400 having inputs 402, 404, 406 and 408, storage locations 411-426, and pass transistors: 16 pass transistors are associated with input 402, 8 pass transistors are associated with input 404, 4 pass transistors are associated with input 406 and two pass transistors are associated with input 408. Element numbers and lead lines for the pass transistors have not been included in FIG. 4 in order to improve clarity of the figure.

When LUT 400 is implemented as an XOR2, then only two of the four inputs are required. The other inputs may be either tied to VCC or ground. Therefore, if the XOR2 is arranged whereby inputs 406 (input C) and 408 (input D) are used, and inputs 402 and 404 are unused, then the 24 pass transistors associated with inputs 402 (input A) and 404 (input B), may all be configured to have drains and sources with the same voltage potentials assuming that other considerations such as routability, CAD run time, and speed do not dictate to the contrary.

This arrangement is further illustrated by the table to the left of FIG. 4. The table indicates which input values are fixed for three different XOR combinations 450, A^B, A^D, and C^D. The number of transistors which may be configured to have drains and sources with the same voltage potentials because the transistors are unused for the particular XOR configuration—i.e., do not change over the course of operation of the circuit—is shown at 452. It can be seen that the greatest number of unused transistors is associated with the C^D XOR gate. The different possibilities of input combinations 454 are shown at the left. It should be noted that all unused inputs in the combinations 454 shown are tied to ground.

In order to form an XOR5, the XOR2 must be combined with an XOR4. When LUT 400 is configured as an XOR4, then all the inputs are used, and none of the storage locations represents don't care bits. Thus, when LUT 400 is implemented as an XOR2, and a similar LUT is implemented as an XOR4, a total of 24 pass transistors, notwithstanding other considerations such as speed or other elements affected by the configuration of this particular LUT, may be configured to have their respective drain voltage equal to their respective source voltage.

However, when an XOR5 is implemented as an XOR3 followed by an XOR3, then more of the pass transistors can be set to have their drain voltages equal to their source voltages (thereby reducing static power consumption resulting from leakage) as follows. In each of the four input LUTs used to form each of the XOR3s in an XOR5, only three of the inputs are used. Therefore, if the three inputs that are used in each LUT are rotated to inputs 404, 406 and 408 in representative LUT 400, then the 16 pass transistors associated with input 402 may preferably be configured to have equal voltages on their respective drains and sources. Therefore, this creates 32 leak-free pass transistors (16 for each LUT instead of 24 in the case of the XOR5 formed from the XOR2 and the XOR4). Such a configuration, thereby, reduces the static power consumption of an XOR5 implemented in a PLD according to the invention.

Figure 5:
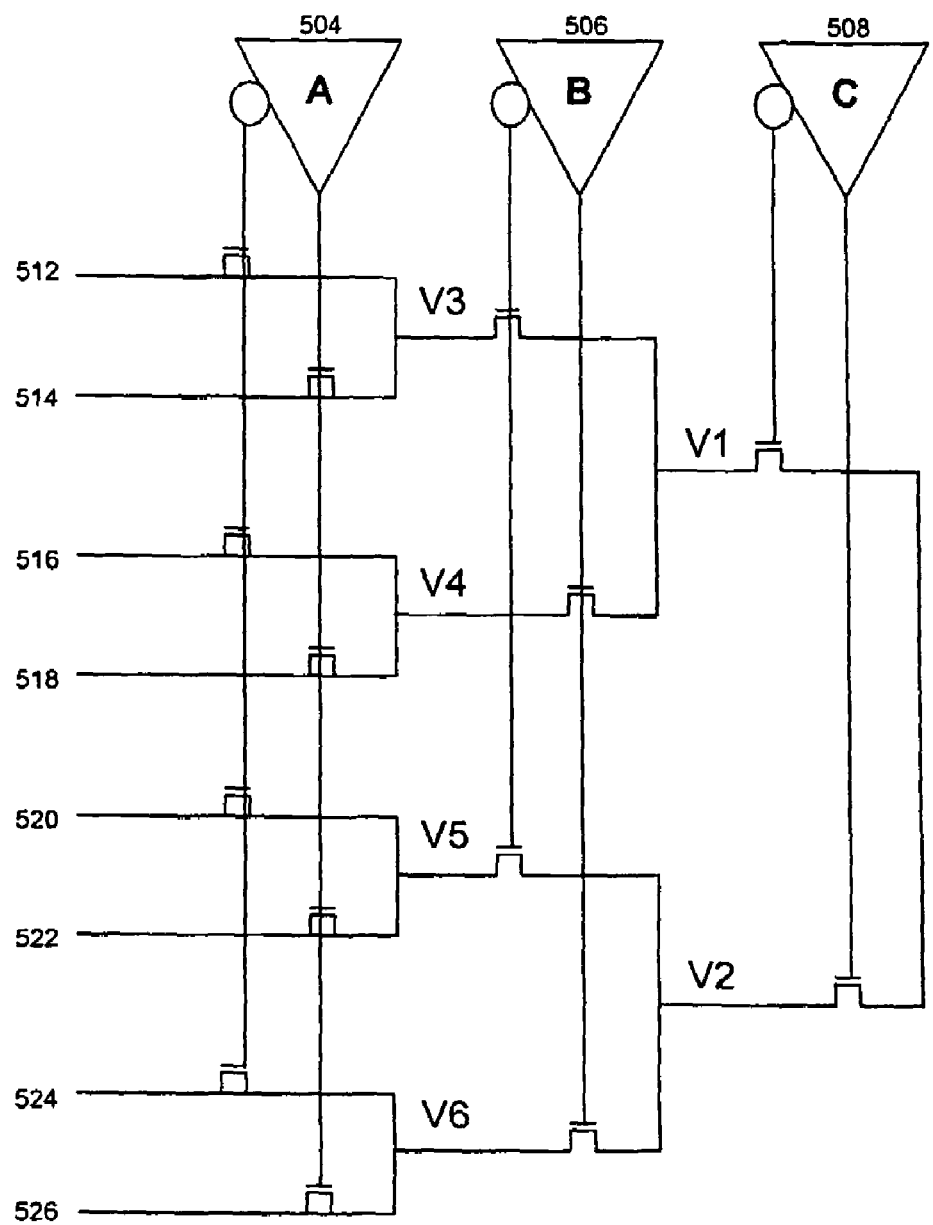

The following is another example of technology mapping according to the invention. In the case of a LUT3 having three inputs 504, 506 and 508, (A, B, and C, respectively), shown in FIG. 5, and a function A OR (B AND C), the number of transistors with the same voltage on the source and drain is 2 (as shown in the following table). Given the logically equivalent function created by rotating the inputs of C OR (A AND B), the number of transistors with the same voltage on the source and drain is 8. Thus, the methods according to the invention suggest that when generating different mapping alternatives, the power should be compared in addition to the density and speed.

|     | A OR (B AND C) | C OR (A AND B) |
|-----|----------------|----------------|
| 512 | 0              | 0              |
| 514 | 1              | 0              |
| 516 | 0              | 0              |
| 518 | 1              | 1              |
| 520 | 0              | 1              |
| 522 | 1              | 1              |
| 524 | 1              | 1              |
| 526 | 1              | 1              |
| V1  | NA             | 0              |
| V2  | NA             | NA             |
| V3  | NA             | 1              |
| V4  | 1              | 1              |
| V5  | NA             | NA             |
| V6  | NA             | 1              |
| Leak-free transistors | 2 | 8          |

In yet another rule that may be implemented according to the invention, in the case of an unused logic element in a PLD, it may be advantageous in certain conditions—e.g., where conflicting considerations do not dictate to the contrary—to set all bits to minimize static power. In one particular embodiment of this rule, it may be determined whether, if the output of the logic element drives a flip flop or other suitable piece of circuitry, a 0 or a 1 is more useful as a potential output value with respect to power consumption to drive the unused routing lines that flow from the logic element. Examples of where such an approach would obtain advantages include: If the output drives an inverting buffer or a non-inverting buffer, it may be that the buffer will draw less power when driven by a 1 or a 0. If the signal drives a wire and that wire is connected to other wires via pass-gates, it would be advantageous for those wires to be at the same voltage level to minimize leakage across the pass-gate. In the case that the other wire is not a constant, but it is known to be predominantly at a known value (either a 0 or 1), it would be preferable to have the constant wire match the more common state of the other wire.

In certain cases a routing wire coupled to the output of such a non-used logic element may feed a number of other elements that are in use or, at the least, may have other requirements with respect to the signals that are driven thereon. Therefore, the signals driven from the unused logic element should preferably take into account the other constraints of the circuit.

A final rule that relates to dynamic power saving relates to any circuit having multiple inputs. One example of such a circuit is a LUT-based multiplexer. A multiplexer may be described as a hardware component that has N data inputs, C control inputs and only one data output. The data on the single output are the data on one of the N data inputs as determined by the state of the C control inputs. Every input can be output through a unique encoding of the C control inputs. Input signals with the highest anticipated switching activity should preferably be allocated to the LUT input that controls the last stage—i.e., input 408 on exemplary LUT 400 in FIG. 4—of the LUT-based multiplexer because this input causes the fewest internal pass transistors of the LUT to switch state on a transition, and, therefore drives the lowest total capacitance. Furthermore, if such a circuit requires multiple LUTs to implement, input signals with the highest anticipated switching activity should be preferably be technology mapped to the LUT closest to the output of the function, or, more generally, to the LUT that will cause the smallest amount of overall switching within the network of LUTs making up the function. For example, in FIG. 2, an input that is switching a lot should be preferentially allocated to XOR 204 rather than XOR 202. Depending on the function, this tradeoff may need to be balanced against absolute circuit speed and area.

With respect to dynamic power estimation techniques—i.e., the additional power consumed by operation above that of static power, the dynamic power being substantially linear in frequency, the total power being the static power plus the dynamic power—the previous rule relating to allocation of relative high switching frequency inputs in a LUT-based multiplexer, or other suitable device, should form a portion of the expected dynamic power determination. The estimated dynamic power should be combined with the estimated static power using an appropriate metric to determine the total power consumption of the PLD. In some applications, static power is more important than total power, and therefore the power determination should preferably weight the static power accordingly. In other applications, total power is more important than static power, and therefore the power determination should preferably weight the total power accordingly.

In general, the above techniques should preferably be balanced against any trade-off in speed and routability—i.e., the relative costs associated with a complex routing scheme that takes power into account as opposed to a scheme that does not take power consumption into account. For example, if the LUT mask rotations described above conflict with achieving the timing specifications required by the design as specified by the user, the appropriate choice should be made depending on the design priority for speed or low power.

Finally, the above LUT mask rotations should preferably be implemented in the module that sets the LUT inputs. For example, the rotations may be implemented during technology mapping, during routing, or in a separate module following routing. The rotations should preferably be implemented to rotate all inputs to the form that is calculated to generate the smallest amount of leakage current. The rotation should preferably take into account embedded drivers, differing transistor types, and different transistor sizings.

FIGS. 6-12 show a series of high-level flow charts that illustrate select embodiments of a method, preferably used in PLD implementation software, according to the invention.

Figure 6:
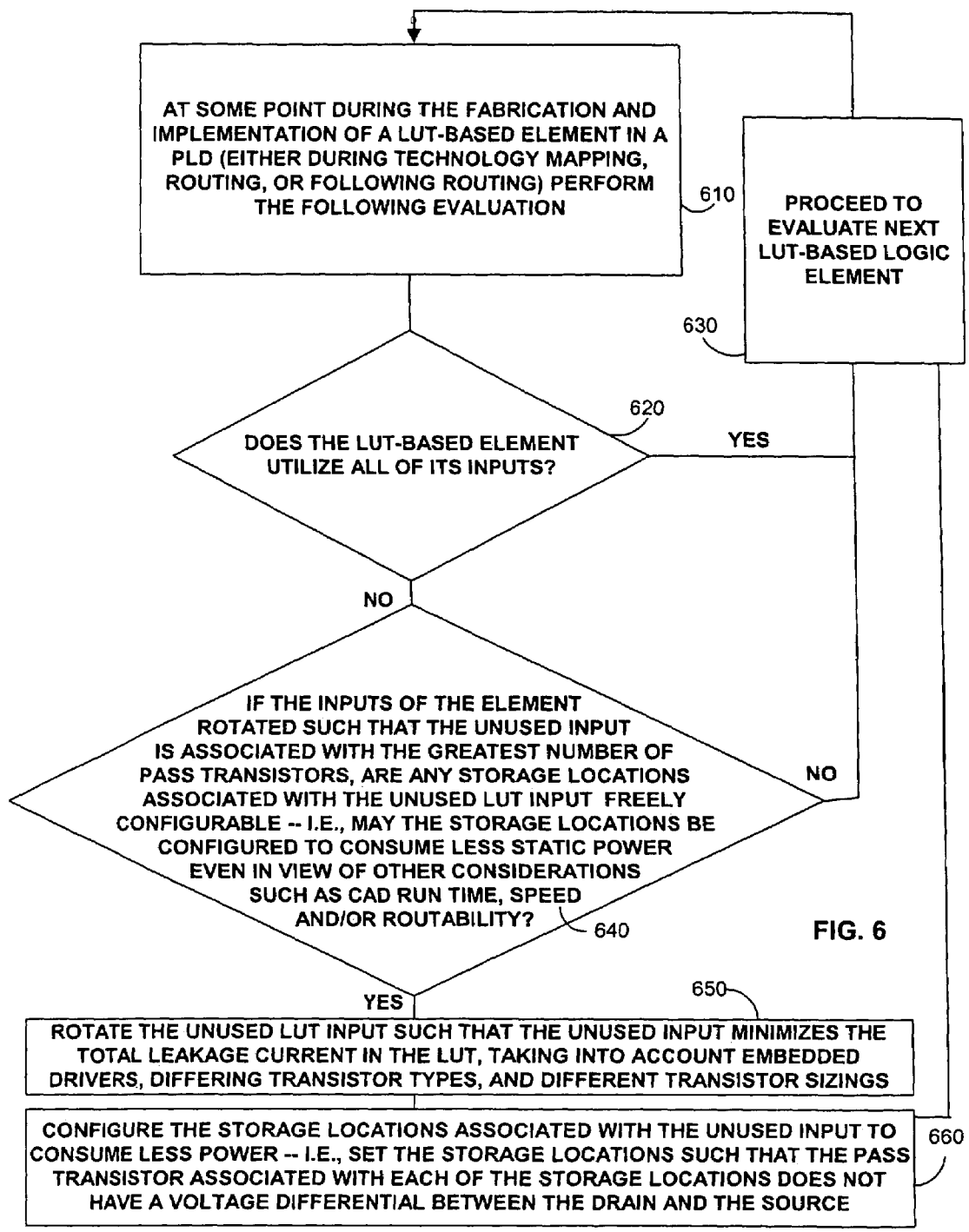
FIGS. 6-12 are flow diagrams that shows various methods according to the invention.

FIG. 6 includes step 610 that shows at some point during the fabrication and implementation of a LUT-based element in a PLD (either during technology mapping, routing, or following routing) performing the following evaluation related to power consumption. Step 620 queries whether the LUT-based element being evaluated utilizes all of its inputs.

If the LUT-based element utilizes all of its inputs, then it is not a candidate for power-savings according to the implementation set forth below in steps 650 and 660, and the method preferably loops through step 630 to proceed to evaluate the next LUT-based logic element. If the LUT-based element utilizes less than all of its inputs, then step 640 shows that the method queries: if the inputs of the element are rotated such that the unused input is associated with the greatest number of pass transistors, are any or all storage locations associated with the unused LUT input freely configurable—i.e., may the storage locations be configured even in view of other considerations such as CAD run time, speed and/or routability to consume less static power?

If the answer to the query in step 640 is NO, then the method preferably loops back to step 630. If the answer to the query in step 640 is YES, then step 650 shows rotating the unused LUT input such that the unused input minimizes the total leakage current in the LUT, taking into account other factors such as embedded drivers such as those discussed above with respect to the inverting and non inverting drivers (in a non-inverting buffer, which typically is formed from two transistors, the second stage transistor is typically larger than the first stage, and, though it passes more current, also consumes more power), differing transistor types (such as an N-type transistor or a P-type transistor), and different transistor sizings[3]. Finally, step 660 shows, after the rotation, configuring the storage locations associated with the unused input to consume less power—i.e., setting the storage locations such that the pass transistor associated with each of the storage locations (or as many storage locations as the design allows) does not have a voltage differential between the drain and the source. This can be accomplished, as described above by setting all the don't care bits, locations 512, 516, 520, and 524, equal to locations 514, 518, 522, and 526, respectively, thereby eliminating leak-free transistors.

[3] A large transistor allows more power to pass through it when it is ON, thus it is faster when driving a large capacitive load. A larger transistor also adds more of a capacitive load to the circuit driving it. A large transistor also has higher leakage when it is OFF. In a typical design, transistors are sized according to the speed, power, and area requirements of the circuit. Within a PLD logic element and routing fabric, different transistors have different sizes. It is important with respect to leakage power that one takes into account the relative size of the transistors involved in addition to the number of transistors.

Figure 7:
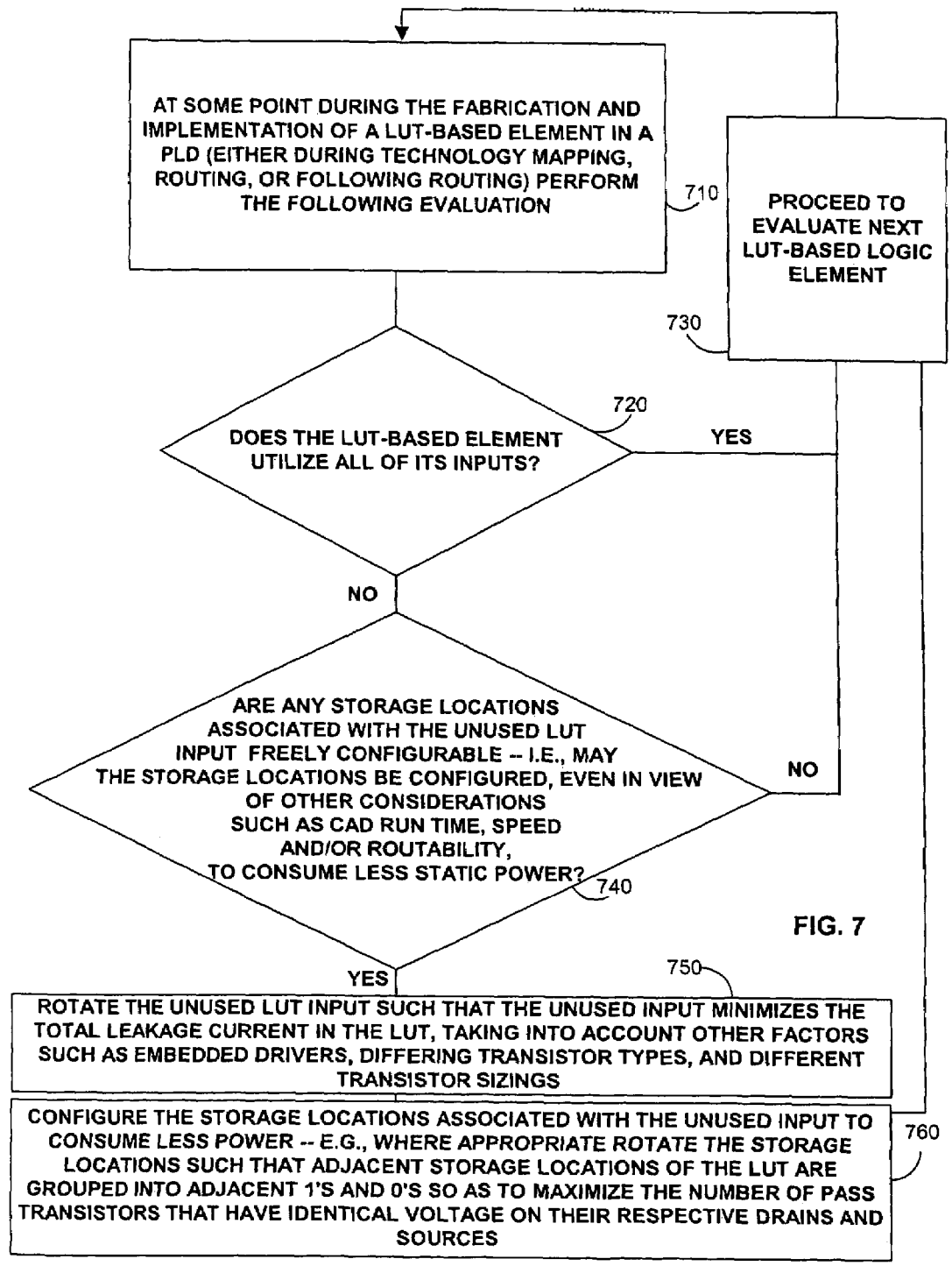

FIG. 7 preferably shows a specific example of the method shown in FIG. 6. Specifically, the difference between FIG. 7 and FIG. 6 is that in step 760 (it should be noted that the other numbered elements of FIG. 7 correspond to the similar numbered elements of FIG. 6), the configuring the storage location preferably requires rotating the storage locations such that adjacent storage locations of the LUT are grouped into adjacent 1's and 0's so as to maximize the number of pass transistors that have identical voltage on their respective drains and sources.

Figure 8:
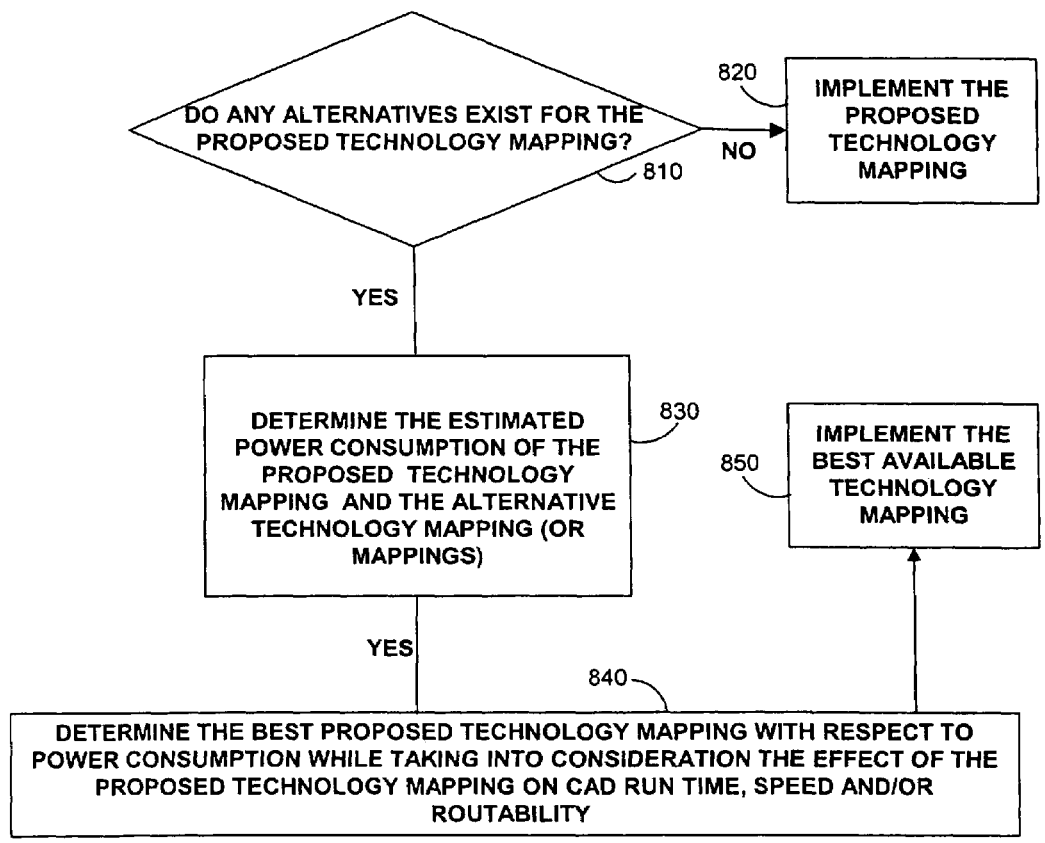

FIG. 8 shows a preferable method according to the invention related to technology mapping. Step 810 shows the method querying whether an alternative mapping or mappings for an element or group of elements exists. Step 820 shows implementing the proposed technology mapping if no other technology mappings exist. Step 830 shows determining the estimated power consumption of each of the possible technology mappings (either for a single element or group of elements). Step 840 shows determining the best proposed technology mapping with respect to power consumption while taking into consideration the effect of the proposed technology mapping on CAD run time, speed and/or routability. Step 850 shows implementing the best available technology mapping. It should be noted that technology mappings as shown in FIG. 8 may be understood to include at least the following situations: 1) an XOR5 (an exclusive OR 5 input gate) that can be implemented as an XOR3 gate feeding and XOR3 gate or as an XOR2 gate feeding an XOR4 gate (see above FIGS. 2 and 3) or 2) wherein a three-input LUT which uses all of its inputs and can implement A OR (B AND C) vs. C OR (A AND B).

Figure 9:
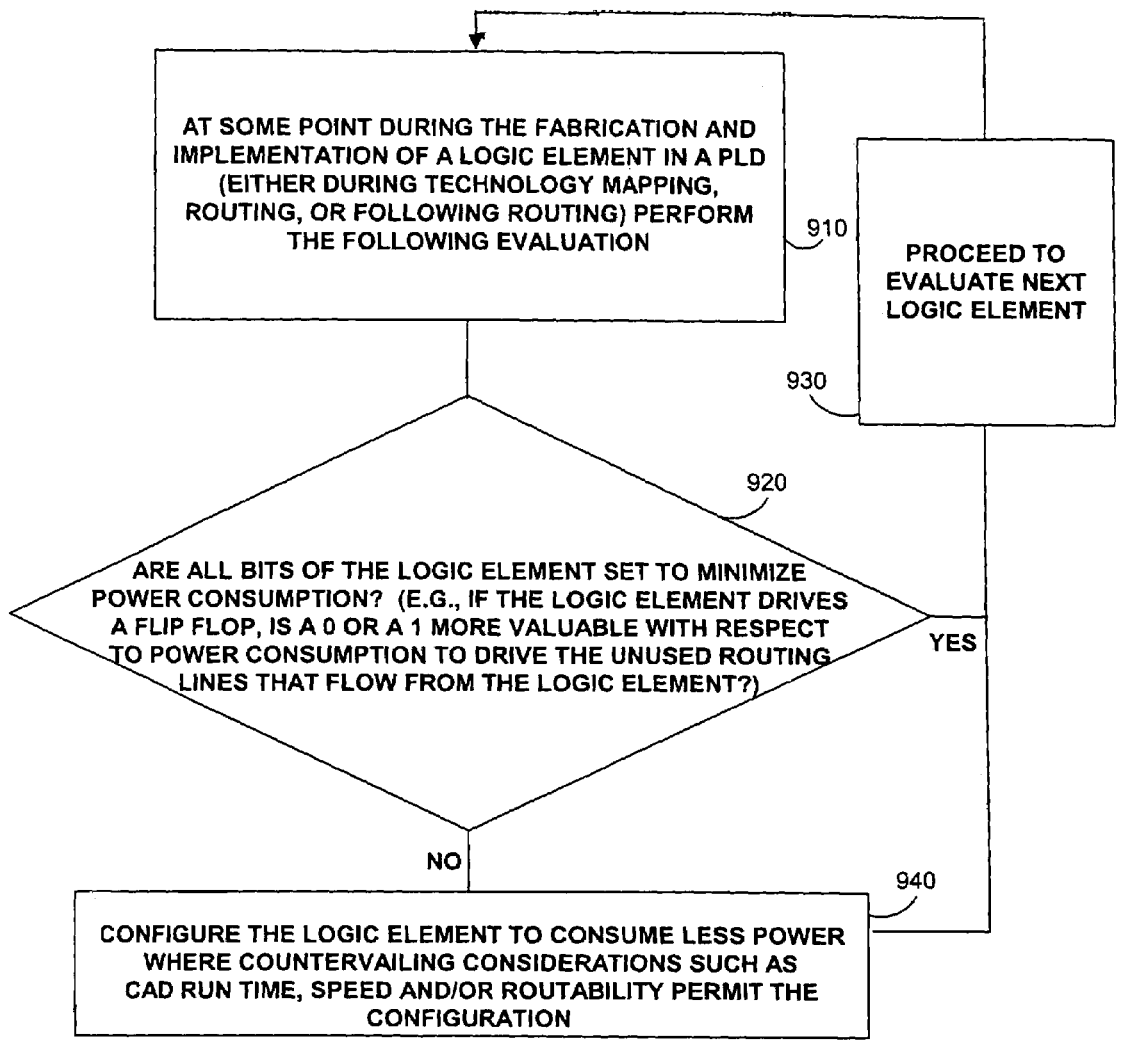

FIG. 9 relates to a method of saving power in configuration of a logic element. Step 910 shows that at some point during the fabrication and implementation of a logic element in a PLD (either during technology mapping, routing, or following routing) the following evaluation is performed. Step 920 shows the query: are all bits of the logic element set to minimize power consumption—e.g., if the logic element drives a flip flop, is a 0 or a 1 more valuable with respect to power consumption to drive the unused routing lines that flow from the logic element?

If all bits of the logic element are set to minimize power consumption, then step 930 shows that the method may proceed to the next logic element to perform a similar determination. If all the bits of the logic element are not set to minimize power consumption, then step 940 shows that the method preferably configures the logic element to consume less power where countervailing considerations such as CAD run time, speed and/or routability permit the configuration. Thereafter, the method may proceed to evaluate the next logic element, as shown in step 930.

Figure 10:
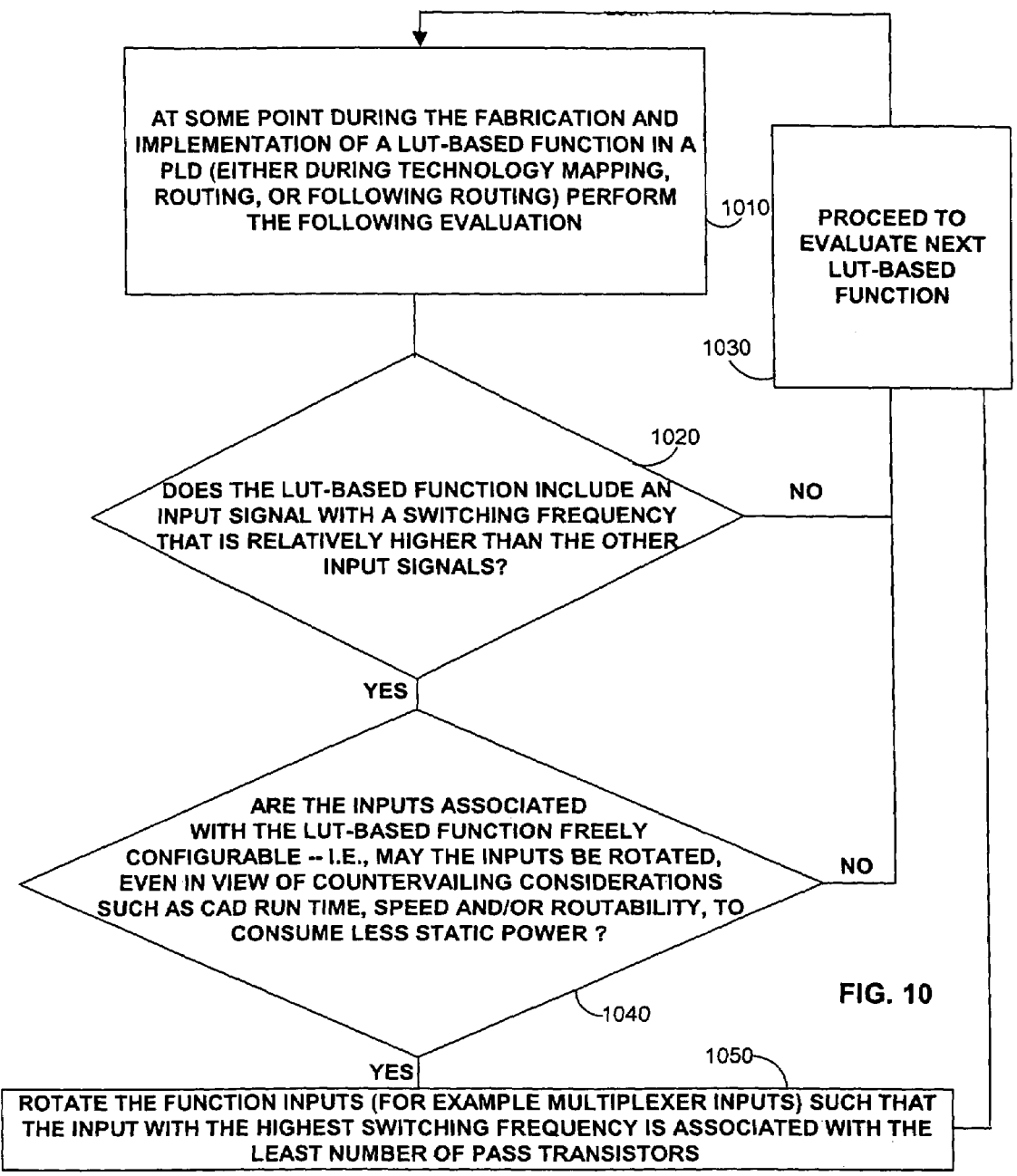

FIG. 10 relates to the method for reducing dynamic power in one or more LUTs. Step 1010 shows at some point during the fabrication and implementation of a LUT-based function in a PLD (either during technology mapping, routing, or following routing) performing the following evaluation. Step 1020 queries: does the LUT-based function include an input signal with a switching frequency that is relatively higher than the other input signals?

Step 1030 shows that if the input signals have substantially the same switching signal frequency, then the method should proceed to the next LUT-based function. Step 1040 queries whether the inputs associated with the LUT-based function are freely configurable—i.e., may the inputs be rotated even in view of countervailing considerations such as CAD run time, speed and/or routability to consume less static power? Finally, step 1050 shows that, if the inputs are freely configurable, then they should be rotated such that the input with the highest switching frequency is associated with the least number of pass transistors and, preferably, to the LUT implementing the function closest to the output. If the inputs are not freely configurable, then the method preferably loops back to step 1030.

In one embodiment of the invention as set forth in FIG. 10, the method embodied may include any circuit implemented within an LE. For example, the circuit shown in FIG. 1, a LUT is made up of several cascaded MUXes. For example, transistors 130 and 132 form a 2:1 MUX, and transistors 138 and 140 form another 2:1 MUX. In a circuit according to the invention, if the circuit has an input that is toggling quickly within a logic element, it is preferable that the input be closer to the front of the logic element—i.e., to the right of FIG. 1—where the toggling signal will have to drive through fewer transistors. In another example, with respect to the circuit in FIG. 5, the toggling input should preferably be input-C. It should be noted that at least with respect to this embodiment, a multiplexer may be considered any circuit or device that includes multiple inputs and a lesser number—e.g., one—output.

In another embodiment of the invention, similar to the embodiment set forth in FIG. 10, the method may include any circuit implemented in multiple LEs. For example, the circuit shown in FIG. 2 is made up of an XOR feeding an XOR. In a circuit according to the invention, if the circuit has an input that is toggling quickly within the circuit, it is preferable that the input be in a LUT closest to the output, thus reducing the number of LUTs (and thus transistors) that are toggling. In some cases, moving an input to a different LUT may cause a change in area or speed to the circuit; in that case the appropriate balance should be made between dynamic power considerations, area, and circuit speed.

Figure 11:
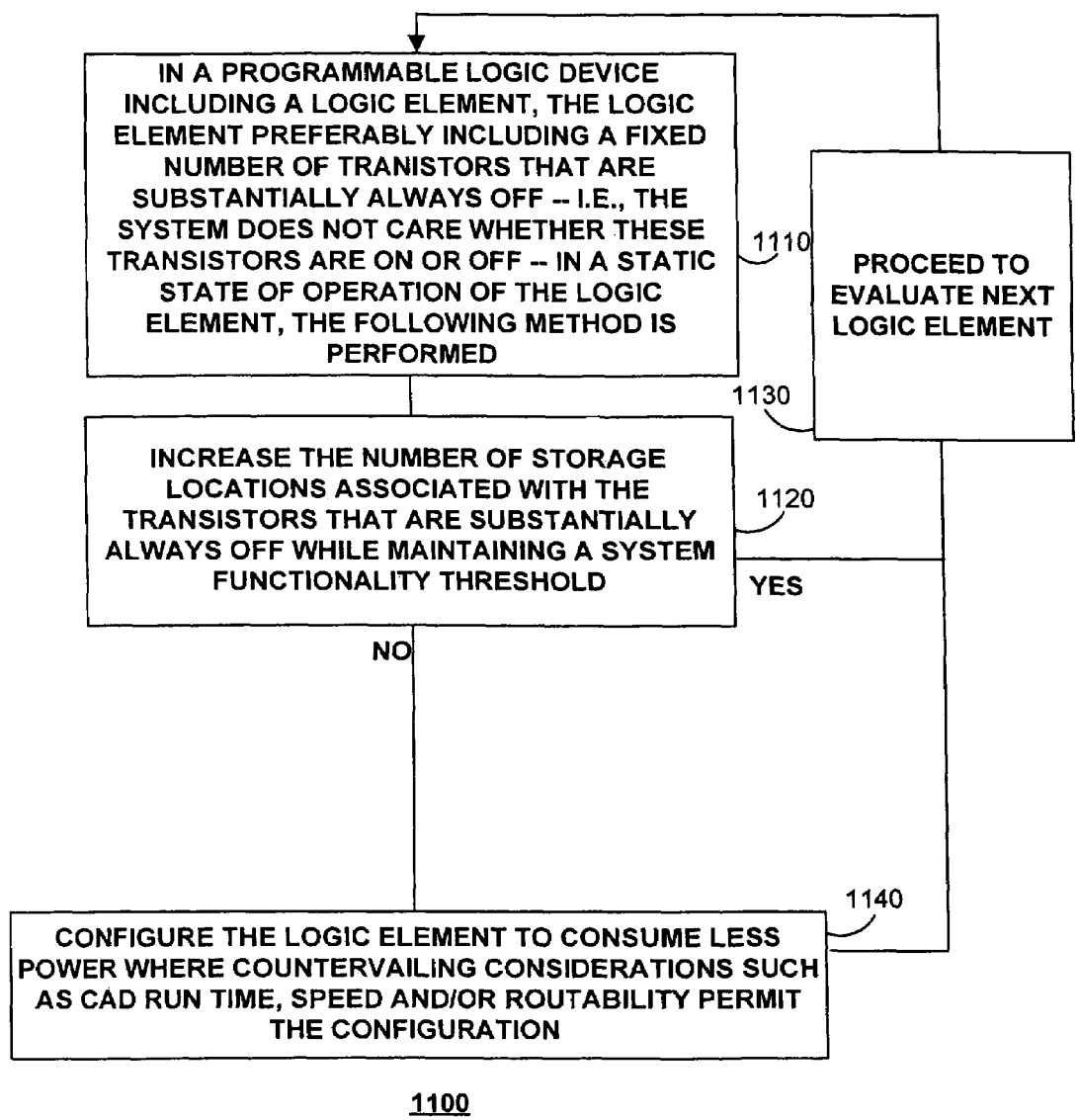

The flow chart 1100 in FIG. 11 shows yet another method according to the present invention. This method preferably is implemented on a programmable logic device including a logic element. The logic element, similar to the logic elements described above, comprises a fixed number of transistors that are always OFF, and therefore have a don't care status, in a static state of operation of the logic element, as shown in step 1110. Step 1120 shows that the system is preferably configured to: increase the number of storage locations associated with the transistors that have a don't care status without altering the system functionality. Then, after each don't care status is assigned to a particular storage location, step 1130 shows that the system is configured to minimize the static power by analysis and manipulation of pass transistors associated with storage locations having don't care status. Step 1140 shows the method looping back to the next logic element where appropriate. The key advantage of this method is that a power calculus is performed after each don't care status is assigned, as opposed to at the end of the circuit design when many decisions may be difficult to unwind.

Figure 12:
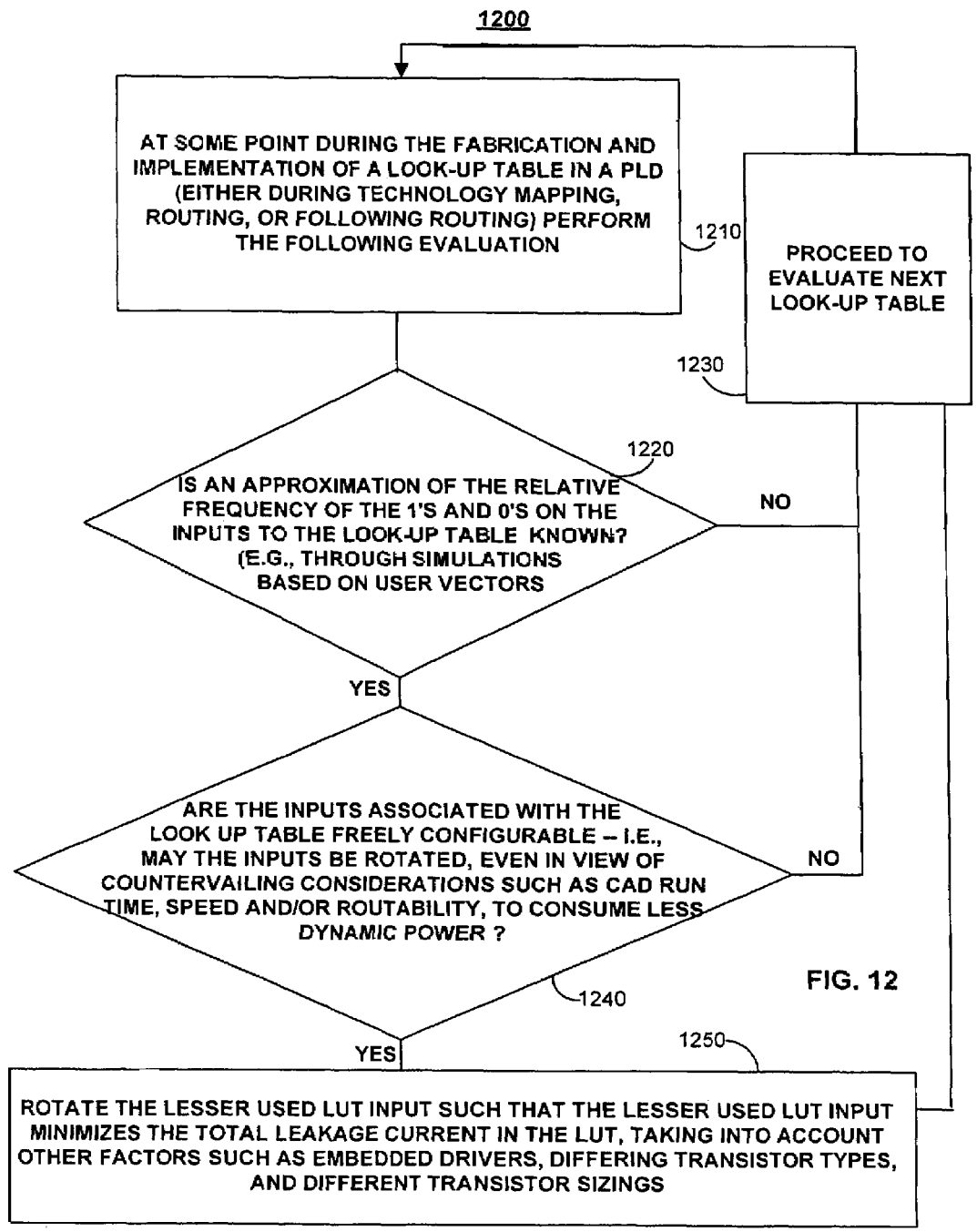

The flow chart 1200 in FIG. 12 shows yet another method according to the present invention. This method preferably is implemented on a programmable logic device including a look-up table. Step 1210 shows at some point during the fabrication and implementation of a look-up table in a PLD (either during technology mapping, routing, or following routing) perform the following evaluation. Step 1220 queries is an approximation of the relative frequency of the 1's and 0's on the inputs to the look-up table known? (e.g., through simulations based on user vectors). Step 1240 queries are the inputs associated with the look up table freely configurable—i.e., may the inputs be rotated, even in view of countervailing considerations such as cad run time, speed and/or routability, to consume less dynamic power? Finally, step 1250 shows rotating the lesser used input such that the lesser used input becomes the input associated with the greatest number of pass transistors, and, consequently, the greatest number of storage locations. Step 1230 shows the step of proceeding to evaluate the next suitable look-up table.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A method for reducing power consumption in a programmable logic device, the programmable logic device being potentially programmed at least in part by a proposed technology mapping, the method comprising:
   determining at least one alternative technology mapping for the proposed technology mapping, wherein determining the at least one alternative technology mapping comprises inverting at least one output of the proposed technology mapping;
   determining which technology mapping of the at least one alternative technology mapping and the proposed technology mapping is the least power consumptive technology mapping; and
   programming the programmable logic device, at least in part, by the least power consumptive technology mapping.

2. The method of claim 1 wherein determining which technology mapping of the at least one alternative technology mapping and the proposed technology mapping is the least power consumptive technology mapping comprises:
   estimating the expected distribution of a low voltage output state and a high voltage output state;
   evaluating the change in static power of driving a signal that is substantially a high voltage versus driving a signal that is substantially a low voltage; and determining which technology mapping minimizes the static power.

3. The method of claim 2 wherein the evaluating is performed during the placement stage.

4. The method of claim 2 wherein the evaluating is performed during the routing stage.

5. The method of claim 1 further comprising determining the change in speed of a function associated with at least one of the at least one alternative technology mapping.

6. The method of claim 1 further comprising comparing the area associated with the proposed technology mapping and the area associated with at least one of the at least one alternative technology mapping.

7. The method of claim 1 wherein the at least one alternative technology mapping comprises an alternative technology mapping with all of the outputs of the proposed technology mapping inverted.

8. The method of claim 1 wherein the at least one alternative technology mapping comprises a technology mapping that is logically equivalent to the proposed technology mapping.

9. The method of claim 1 wherein the at least one alternative technology mapping comprises a technology mapping that is the inverse of the proposed technology mapping.

10. A method for reducing power consumption in a programmable logic device, the programmable logic device comprising a plurality of look-up table based logic elements, the method comprising:
    evaluating whether a look-up table based logic element of the plurality of look-up table based logic elements utilizes all of its inputs during the operation of the programmable logic device;
    if the look-up table based logic element does not utilize all of its inputs during the operation of the programmable logic device, reconfiguring the inputs of the look-up table based logic element so that the look-up table based logic element is characterized by an equivalent logical function;
    determining whether any storage locations associated with the unutilized input or inputs of the look-up table based logic element are freely-configurable; and
    if more of the storage locations associated with the look-up table based logic element are freely-configurable than before the reconfiguring, performing the reconfiguration such that the pass transistors associated with the unutilized input or inputs consume a reduced power.

11. The method of claim 10, wherein the evaluating occurs during a technology mapping relating to the look-up table based logic element.

12. The method of claim 10, wherein the evaluating occurs during a routing period relating to the look-up table based logic element.

13. The method of claim 10, wherein the evaluating occurs following a routing period relating to the look-up table based logic element.

14. The method of claim 10, further comprising determining the change in speed of a function associated with the look-up table based logic element, the change in speed being attributable to the reconfiguring.

15. The method of claim 10, further comprising determining the change in area of the look-up table based logic element and the associated routing, the change in area being attributable to the reconfiguring.

16. The method of claim 10 wherein the equivalent logical function comprises the negation of the logical function.

17. The method of claim 10 wherein the equivalent logical function comprises the inverse of the logical function.

18. A method for reducing power consumption in a programmable logic device, the programmable logic device comprising a plurality of logic elements, the method comprising:

evaluating if at least one of the plurality of logic elements is used during the operation of the programmable logic device;

if at least one of the look-up table based logic elements is not used during the operation of the programmable logic device, determining a minimum power state of the at least one unused logic element; and evaluating whether the minimum power output state of the at least one unused logic element should be implemented based, at least in part, on at least one of routing and performance of the programmable logic device.

19. The method of claim 18, wherein the evaluating occurs during a technology mapping relating to one of the plurality of logic elements.

20. The method of claim 18, wherein the evaluating occurs during a routing period relating to one of the plurality of logic elements.

* * * * *